(12) United States Patent
Bitauld et al.

(10) Patent No.: US 10,574,449 B2
(45) Date of Patent: Feb. 25, 2020

(54) FIBRE-OPTIC COMMUNICATION BASED ON DUAL-RAIL AND POLARIZATION ENCODING

(71) Applicant: Nokia Technologies Oy, Espoo (FI)

(72) Inventors: David Bitauld, Cambridge (GB); Hongwei Li, Cambridge (GB); Antti Niskanen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 79 days.

(21) Appl. No.: 15/567,200

(22) PCT Filed: Apr. 22, 2015

(86) PCT No.: PCT/FI2015/050278
§ 371 (c)(1),
(2) Date: Oct. 17, 2017

(87) PCT Pub. No.: WO2016/170223
PCT Pub. Date: Oct. 27, 2016

(65) Prior Publication Data
US 2018/0109379 A1    Apr. 19, 2018

(51) Int. Cl.
*H04L 29/06* (2006.01)
*H04L 9/08* (2006.01)
(Continued)

(52) U.S. Cl.
CPC ............ *H04L 9/0858* (2013.01); *G02B 6/272* (2013.01); *G02B 6/274* (2013.01); *G02B 6/278* (2013.01);
(Continued)

(58) Field of Classification Search
CPC ..... H04L 9/0858; H04L 9/0852; G02B 6/274; G02B 6/278; G02B 6/2861;
(Continued)

(56) References Cited

U.S. PATENT DOCUMENTS

| 6,529,601 B1 | 3/2003 | Townsend |
| 6,538,787 B1 | 3/2003 | Moeller et al. |

(Continued)

FOREIGN PATENT DOCUMENTS

| CN | 101764648 B | 12/2012 |
| CN | 104350701 A | 2/2015 |

(Continued)

OTHER PUBLICATIONS

Tang et al., "High Speed Fiberbased Quantum Key Distribution Using Polarization Encoding", Proceedings of SPIE, 5893, Optics and Photonics Conference, Aug. 1-4, 2005, 9 pages.
(Continued)

*Primary Examiner* — Jeffrey C Pwu
*Assistant Examiner* — William A Corum, Jr.
(74) *Attorney, Agent, or Firm* — Nokia Technologies Oy

(57) ABSTRACT

According to an example aspect, there is provided an apparatus comprising a first optical converter coupled to a fiber interface and to two waveguides, a dual rail encoder configured to encode dual rail form light from the two waveguides with payload information, and wherein the dual rail encoder is coupled to the first optical converter or to a second optical converter disposed between the dual rail encoder and the fiber interface, and wherein the first optical converter or the second optical converter is coupled so as to provide polarization encoded light into the fiber interface.

21 Claims, 9 Drawing Sheets

(51) Int. Cl.
*H04B 10/70* (2013.01)
*G02F 1/21* (2006.01)
*H04B 10/532* (2013.01)
*H04B 10/2569* (2013.01)
*G02B 6/27* (2006.01)
*G02B 6/28* (2006.01)
*G02B 6/293* (2006.01)
*H04B 10/548* (2013.01)

(52) U.S. Cl.
CPC ....... *G02B 6/2861* (2013.01); *G02B 6/29352* (2013.01); *G02B 6/29395* (2013.01); *G02F 1/21* (2013.01); *H04B 10/2569* (2013.01); *H04B 10/532* (2013.01); *H04B 10/548* (2013.01); *H04B 10/70* (2013.01); *H04L 9/0852* (2013.01)

(58) Field of Classification Search
CPC ........................ G02B 6/29352; G02B 6/29395; G02B 6/272; H04B 10/548; H04B 10/70; H04B 10/532; H04B 10/2569; G02F 1/21
See application file for complete search history.

(56) References Cited

U.S. PATENT DOCUMENTS

| | | | |
|---|---|---|---|
| 8,054,976 | B2 | 11/2011 | Harrison et al. |
| 8,477,939 | B2 | 7/2013 | Youn et al. |
| 8,605,288 | B2 | 12/2013 | Bennett et al. |
| 9,219,605 | B2 | 12/2015 | Niskanen et al. |
| 9,866,379 | B2 * | 1/2018 | Nordholt ............... H04L 9/0858 |
| 2006/0072922 | A1 | 4/2006 | MacDonald et al. |
| 2007/0116286 | A1 | 5/2007 | Yuan et al. |
| 2007/0192598 | A1 * | 8/2007 | Troxel .................. H04L 9/0852 713/168 |
| 2012/0177134 | A1 * | 7/2012 | Shields .................. H04B 10/70 375/259 |
| 2012/0224846 | A1 * | 9/2012 | Swanson ............. H04L 43/0852 398/13 |
| 2013/0084079 | A1 | 4/2013 | Nordholt et al. |
| 2013/0136450 | A1 | 5/2013 | Roberts et al. |
| 2013/0322809 | A1 | 12/2013 | Goh et al. |
| 2015/0172048 | A1 * | 6/2015 | Wabnig .................. H04B 10/70 380/256 |
| 2015/0236791 | A1 * | 8/2015 | Nordholt ............... H04B 10/70 398/184 |
| 2015/0249537 | A1 * | 9/2015 | Wabnig .................. H04B 10/70 380/256 |
| 2016/0112192 | A1 * | 4/2016 | Earl ...................... H04L 9/0825 380/44 |

FOREIGN PATENT DOCUMENTS

| | | |
|---|---|---|
| WO | 03/019468 A1 | 3/2003 |
| WO | 2006/074151 A2 | 7/2006 |
| WO | 2012/047086 A1 | 4/2012 |
| WO | 2012/047087 A1 | 4/2012 |
| WO | 2013/179094 A1 | 12/2013 |
| WO | 2014/060793 A1 | 4/2014 |
| WO | 2015/189456 A1 | 12/2015 |

OTHER PUBLICATIONS

Mariola et al., "Open-source Electronics for Quantum Key Distribution", South African Institute of Physics, 2013, 6 pages.

International Search Report and Written Opinion received for corresponding Patent Cooperation Treaty Application No. PCT/FI2015/050278, dated Sep. 23, 2015, 15 pages.

Bethune et al., "Autocompensating Quantum Cryptography", New Journal of Physics, vol. 4, 2002, pp. 1-18.

Franson et al., "Operational System for Quantum Cryptography", Electronics Letter, vol. 31, No. 3, Feb. 2, 1995, pp. 232-234.

Ralph, "Quantum Optical Systems for the Implementation of Quantum Information Processing", Reports on Progress in Physics, vol. 69, No. 4, Mar. 1, 2006, 29 pages.

Tentative Rejection received for corresponding Taiwan Patent Application No. 105112425, dated Apr. 26, 2017, 3 pages of Tentative Rejection and 2 pages of translation available.

International Preliminary Report on Patentability received for corresponding Patent Cooperation Treaty Application No. PCT/FI2015/050278, dated May 19, 2017, 12 pages.

Partial Supplementary European Search Report received for corresponding European Patent Application No. 15889785.0, dated Nov. 23, 2018, 12 pages.

Wu et al., "No-go Theorem for Passive Single-Rail Linear Optical Quantum Computing", Quantum Physics, Feb. 13, 2013, pp. 1-7.

Hayes et al., "Utilizing Encoding in Scalable Linear Optics Quantum Computing", Quantum Physics, Aug. 15, 2004, pp. 1-10.

Extended European Search Report received for corresponding European Patent Application No. 15889785.0, dated Jan. 28, 2019, 12 pages.

Office action received for corresponding Chinese Patent Application No. 201580080640.0, dated Jun. 20, 2019, 6 pages of office action and 3 pages of Translation available.

Office action received for corresponding European Patent Application No. 15889785.0, dated Oct. 8, 2019, 12 pages.

* cited by examiner

FIBRE-OPTIC COMMUNICATION BASED ON DUAL-RAIL AND POLARIZATION ENCODING

RELATED APPLICATION

This application was originally filed as Patent Cooperation Treaty Application No. PCT/FI2015/050278 filed Apr. 22, 2015.

FIELD

The present invention relates to optical communication, such as for example to optical quantum key distribution.

BACKGROUND

Information may be secured in a number of ways. Information that is confidential in nature may comprise financial, medical, corporate, political or personal information, for example.

Confidential information may be stored in secure premises, preventing accidental or malicious access to the information by placing it in a locked place, such as for example in a safe in an office. Corporate locations may be further, or alternatively, provided with alarm systems, guards, fences and/or other access control functions.

Confidential information may be stored in computers that are not connected to any unsecure networks, to prevent unauthorized network intrusion therein to obtain the information. Such computers may be referred to as "air walled" computers as they have no connection to unsecure networks.

One way to prevent unauthorized access to confidential information is encryption, wherein a plaintext, for example a text in a natural language, such as French, is converted to a ciphertext using an encryption algorithm and a key. Encryption algorithms are designed to render it very difficult to obtain the plaintext from the ciphertext without the key. In general, ciphertext may be known as encrypted information.

In quantum communication, QC, two parties may exchange information encoded in quantum states. The quantum states may be qubits, which are composed of the superposition of two orthogonal states such as orthogonal polarization states of a photon or qubits, may comprise specially defined properties of photons such as pairs of polarization states, such as 0° and 90°. Diagonal, 45°, anti-diagonal, −45°, or circular basis states such as left-handedness and right-handedness are possible superpositions of the 0° and 90° polarization states. Through quantum communication, the two parties may produce a shared random series of bits known only to them, which can then be used as secret keys in subsequent encryption and decryption of messages. A third party can, in theory, eavesdrop on the QC between the two parties. Such eavesdropping perturbs the QC, however, introducing anomalies that the two intended parties can detect. The two parties may post-process the results of the QC to remove any partial information acquired by an eavesdropper, and form shared secret keys from the remaining information resulting from the QC.

An eavesdropper intercepting and re-transmitting a photon comprised in a quantum communication can only guess the original sending basis when it re-encodes and re-transmits the photon toward its original destination. The receiver may detect the eavesdropping since for subsets of bit values for which sending basis and measuring basis are found to match, parity values should match exactly, assuming the communication system is well tuned and free from imperfections in transmission and reception. Discrepancies in bit values introduced by eavesdropping enable the transmitter and receiver to detect eavesdropping and correct the secret keys.

SUMMARY OF THE INVENTION

The invention is defined by the features of the independent claims. Some specific embodiments are defined in the dependent claims.

According to a first aspect of the present invention, there is provided an apparatus comprising a first optical converter coupled to a fibre interface and to two waveguides, a dual rail encoder configured to encode dual rail form light from the two waveguides with payload information, and wherein the dual rail encoder is coupled to the first optical converter or to a second optical converter disposed between the dual rail encoder and the fibre interface, and wherein the first optical converter or the second optical converter is coupled so as to provide polarization encoded light into the fibre interface.

Various embodiments of the first aspect may comprise at least one feature from the following bulleted list:
- the first optical converter comprises a polarization rotator splitter combiner arranged to receive light from the fibre interface and the output of the dual rail encoder
- the first optical converter comprises a polarization splitter rotator arranged to convert light from the fibre interface into the dual rail form light, and the second optical converter comprises a polarization rotator combiner arranged to convert the output of the dual rail encoder into polarization encoded light
- the apparatus further comprises at least one processing core configured to obtain, from an interface distinct from the fibre interface, adjustment information concerning a fibre and to control the dual rail encoder to at least in part modify the dual rail form light to correct for polarization rotation caused by the fibre
- the fibre interface comprises a single-mode optical fibre interface
- the apparatus further comprises at least one variable optical attenuator, each of the at least one variable optical attenuator being configured to apply a variable attenuation to reduce light intensity
- the interface comprises an electric communications interface
- the dual rail encoder comprises a Mach-Zehnder interferometer
- the payload information comprises an encryption key.

According to a second aspect of the present invention, there is provided an apparatus comprising a fibre interface configured to provide light from a light source to the fibre, a detector configured receive light from the fibre interface and to measure at least one quantity of the received light, and at least one processing core configured to communicate adjustment information concerning the fibre via an interface distinct from the fibre interface.

Various embodiments of the second aspect may comprise at least one feature from the following bulleted list:
- the apparatus further comprises at least one polarization compensation stage configured to, at least in part, correct for polarization rotation caused by the fibre based at least in part on the adjustment information
- the at least one polarization compensation stage is comprised in a dual rail encoder configured to receive dual rail encoded light from a polarization rotator combiner, and to modify the dual rail encoded light the at least one polarization compensation stage comprises a first polarization compensation stage arranged between the light source and the fibre interface the at least one polarization compensation stage comprises a first polarization compensation stage arranged between the fibre interface and the detector the at least one polarization compensation stage comprises a first polarization compensation stage arranged between the light source and the fibre interface and a second polarization compensation stage arranged between the fibre interface and the detector the light source comprises a laser.

According to a third aspect of the present invention, there is provided a method comprising converting light incoming via a fibre into an apparatus into dual rail form light, encoding, with a dual rail encoder, the dual rail form light with payload information, converting the dual rail encoded light to polarization encoded light, and providing the polarization encoded light into the fibre.

Various embodiments of the third aspect may comprise at least one feature corresponding to a feature from the preceding bulleted list laid out in connection with the first aspect.

According to a fourth aspect of the present invention, there is provided a method, comprising providing light from a light source to a fibre via an fibre interface, receiving light from the fibre interface and measuring at least one quantity of the received light, and communicating adjustment information concerning the fibre via an interface distinct from the fibre interface.

Various embodiments of the fourth aspect may comprise at least one feature corresponding to a feature from the preceding bulleted list laid out in connection with the second aspect.

According to a fifth aspect of the present invention, there is provided an apparatus comprising means for converting light incoming via a fibre into the apparatus into dual rail form light, means for encoding, with a dual rail encoder, the dual rail form light with payload information, means for converting the dual rail encoded light to polarization encoded light, and means for providing the polarization encoded light into the fibre.

According to a sixth aspect of the present invention, there is provided an apparatus comprising means for providing light from a light source to a fibre via an fibre interface, means for receiving light from the fibre interface and for measuring at least one quantity of the received light, and means for communicating adjustment information concerning the fibre via an interface distinct from the fibre interface.

According to a seventh aspect of the present invention, there is provided a non-transitory computer readable medium having stored thereon a set of computer readable instructions that, when executed by at least one processor, cause an apparatus to at least convert light incoming via a fibre into an apparatus into dual rail form light, encode, with a dual rail encoder, the dual rail form light with payload information, convert the dual rail encoded light to polarization encoded light, and provide the polarization encoded light into the fibre.

According to an eighth aspect of the present invention, there is provided a non-transitory computer readable medium having stored thereon a set of computer readable instructions that, when executed by at least one processor, cause an apparatus to at least provide light from a light source to a fibre via an fibre interface, receive light from the fibre interface and measure at least one quantity of the received light, and communicate adjustment information concerning the fibre via an interface distinct from the fibre interface.

According to a ninth aspect of the present invention, there is provided a computer program configured to cause a method in accordance with at least one of the third and the fourth aspects to be performed.

EMBODIMENTS

Most fibres used for communication, such as single mode, SM, fibres, do not preserve polarization of light during propagation through the fibre. Compensating for rotation of polarization in a fibre when qubits are dual rail encoded may enable a compact and fully integrated implementation on a chip for emitter and/or receiver. Likewise placing a light source at only one of the communicating units enables a more compact implementation, for example using photonic technologies, of the other unit, which may be configured to encode light received over a fibre from the unit with the light source. Dual rail compensation may also facilitate use of a single fibre for use in both directions, to enable both provision of light in one direction and conveying of encoded light in the other direction using the same fibre, which need not be polarization preserving.

Dual rail encoding may be implemented on two waveguides, which may be parallel. Information may be encoded on the relative phase and amplitudes of the light in the two waveguides. Operations on the relative phase and amplitudes can be performed by phase shifters on at least one of the two waveguides and/or by optical couplers between the two waveguides. In general, dual-rail encoding may thus comprise modifying at least one of amplitude and phase of the light in at least one of the two waveguides, such that a difference in delay between light in the two waveguides is much less than time used to communicate a bit.

Figure 1A:
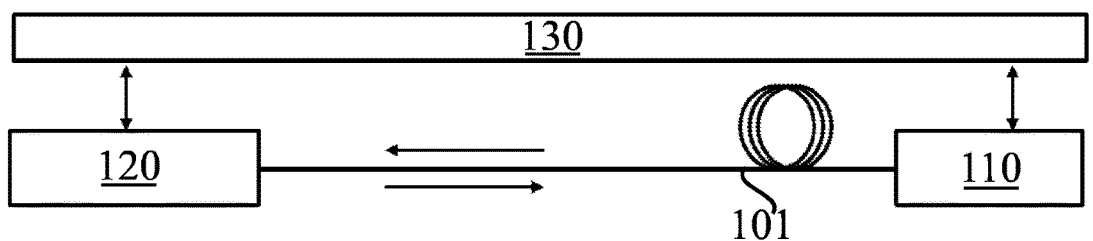
FIG. 1A illustrates a system in accordance with at least some embodiments of the present invention.

FIG. 1A illustrates a system in accordance with at least some embodiments of the present invention. The system of FIG. 1A comprises an emitter 120, as well as a receiver 110, a fibre 101 arranged between emitter 120 and receiver 110. Receiver 110 may comprise a fibre interface enabling receiver 110 to be coupled with fibre 101. Emitter 120 may comprise a fibre interface enabling emitter 120 to be coupled with fibre 101. A separate communication path 130 provides a communication pathway between emitter 120 and receiver 110 that is independent of fibre 101.

Fibre 101 may comprise, for example, a single mode, SM, fibre that does not preserve polarization of light traversing it. Fibre 101 may comprise an optical fibre. Fibre 101 may exhibit birefringence, wherein imperfections in the fibre, stress and/or bending of the fibre may cause polarization of photons passing through the fibre to rotate. Birefringence of fibre 101 may be time-varying as temperatures of sections of the fibre may change, the fibre may be physically rearranged to change the bends it is arranged in, or the number of physical imperfections in the fibre may increase with time. The core of fibre 101 may comprise glass or transparent plastic, surrounded by a layer of material with a lower index of refraction, such as a different glass or plastic, for example. Fibre 101 may also cause, at least in part, attenuation of light passing through it and/or depolarization of light passing through it. In at least some embodiments, fibre 101 comprises a single fibre.

Communication path 130 may comprise, for example, a second fibre distinct from fibre 101, or an electrical and/or at least in part wireless communication channel. For example, communication path 130 may comprise an internet protocol, IP, connection that receiver 110 and emitter 120 may communicate over, using IP addresses of receiver 110 and emitter 120. Communication path 130 may traverse, at least in part, the Internet and/or a corporate or peer-to-peer, p2p, network.

Receiver 110 may comprise a light source, such as, for example, a laser light source. A laser light source may comprise a continuous-wave or modulated laser light source, for example. To receive information from emitter 120, receiver 110 may be configured to provide light from the light source comprised in receiver 110, via fibre 101, to emitter 120. In emitter 120, light received from receiver 110 via fibre 101 may be converted to dual rail form, encoded with information, converted to polarization encoded light and guided back to fibre 101, which will then convey the light back to receiver 110, where the information encoded into the light can be recovered. Light may be converted to dual rail form, for example, by splitting it to two orthogonal polarization components which are conveyed into two waveguides, one component into each waveguide. The light in one or two of the resulting components may be rotated so that the two rails have the same polarization. Information encoded into the light, that is, information that is desired to communicate from emitter 120 to receiver 110, may be referred to as payload information.

Receiver 110 may be configured to measure polarization of light incoming into receiver 110 from emitter 120. Such measuring may occur in fixed polarization bases, for example, using a suitable detector. In order to successfully measure the polarization encoded light in receiver 110, polarization rotation incurred in fibre 101 may be compensated for. In some embodiments, receiver 110 is configured to convert polarization encoded light arriving from emitter 120, via fibre 101, into dual rail encoded form.

Compensating for polarization rotation in fibre 101 may be performed in emitter 120, receiver 110 or partly in emitter 120 and partly in receiver 110. Communication path 130 may be employed in communicating adjustment information usable in performing the compensating. For example, receiver 110 may inform emitter 120 of results of polarization measurements performed in receiver 110. Emitter 120 may thereafter deduce how much rotation occurs in fibre 101, since emitter 120 knows the polarization characteristics of light it transmitted into fibre 101. Where the compensating is performed in emitter 120, it may be done in a dual rail encoder of emitter 120 at the same time as the light is encoded with the information that is to be transmitted to receiver 110.

As birefringence properties of fibre 101 may change over time, receiver 110 and emitter 120 may use communication path 130 to periodically, or responsive to deterioration of communication quality, re-calibrate the compensating of polarization rotation incurred in fibre 101. For example, re-calibrating may be performed with a periodicity of 50 milliseconds, 500 milliseconds or one second.

The payload information the light is encoded with in emitter 120 may comprise, for example, at least one encryption key which can be communicated to receiver 120 over fibre 101 in a low-intensity regime once the polarization rotations of fibre 101 are controlled, as described herein.

Figure 1B:
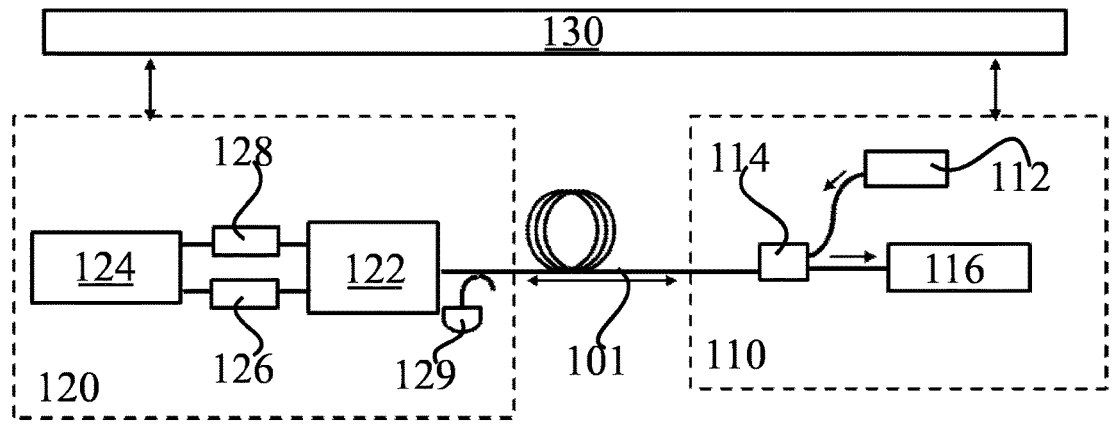
FIG. 1B illustrates a system in accordance with at least some embodiments of the present invention.

FIG. 1B illustrates a system in accordance with at least some embodiments of the present invention. The system of FIG. 1B may be seen as an embodiment of the system of FIG. 1A, presented in more detail than FIG. 1A. Receiver 110, emitter 120, communication path 130 and fibre 101 correspond to like elements in FIG. 1A.

Receiver 110 comprises light source 112, which may comprise, as described above, a laser, such as a continuous-wave or modulated laser, for example. Light from light source 112 is directed toward fibre 101 via device 114, which may comprise, for example, a coupler or circulator. Light arriving in receiver 110 may be measured in detector 116.

In FIG. 1B, emitter 120 is configured to compensate for polarization rotation that occurs in fibre 101. Emitter 120 comprises a detector 129 configured to measure a power of light incoming to emitter 120 via fibre 101. This power may be used to configure variable optical attenuators 126 and 128 to select a suitable attenuation factor. Emitter 120 further comprises an optical converter, such as, for example, a polarization rotation splitter combiner, PBS, 122. PBS 122 is configured to convert light incoming to emitter 120 via fibre 101 to dual rail form. The light incoming to emitter 120 via fibre 101 may be unencoded light, for example. Emitter 120 further comprises dual rail encoder 124, which is configured to encode the dual rail form light with the information, and also to perform the compensating for polarization rotation incurred in fibre 101. Dual rail encoder 124 may comprise a Mach-Zehnder interferometer, for example. In general, dual rail encoder 124 may be configured to cause the dual rail form light it receives from PBS 122 to undergo transformations that result in the encoding and the compensation. In FIG. 1B, detector 129 and the variable optical attenuation may be disposed on either side of PBS 122.

The dual rail encoded light may be caused to re-enter PBS 122, PBS 122 being further configured to convert the dual rail encoded light to polarization encoded light before its conveyance back to receiver 110 via fibre 101. Initially, when calibrating the compensation, receiver 110 and emitter 120 may exchange un-attenuated or lightly attenuated light. Subsequently, once the calibration is complete, variable optical attenuators 126 and 128, disposed on waveguides coupling PBS 122 to dual rail encoder 124, may be caused to attenuate the light so that the light encoded with the information to be communicated from emitter 120 to receiver 110 may be in a single-photon regime, for example. Pulses of even less than one photon per pulse may be employed, depending on the form of encoding that is used. When updating the calibration, un-attenuated or lightly attenuated light may once again be employed.

Alternatively to employing a PBS 122, emitter 120 may comprise a polarization splitter rotator that is configured to convert incoming light into dual rail form, and a separate polarization rotator combiner that is configured to convert the dual rail encoded light back to polarization encoded format before conveying it back to fibre 101. In such a case, emitter 120 comprises two optical converters, the polarization splitter rotator configured to convert incoming light into dual rail form and the polarization rotator combiner that is configured to convert the dual rail encoded light back to polarization encoded format.

Figure 2A:
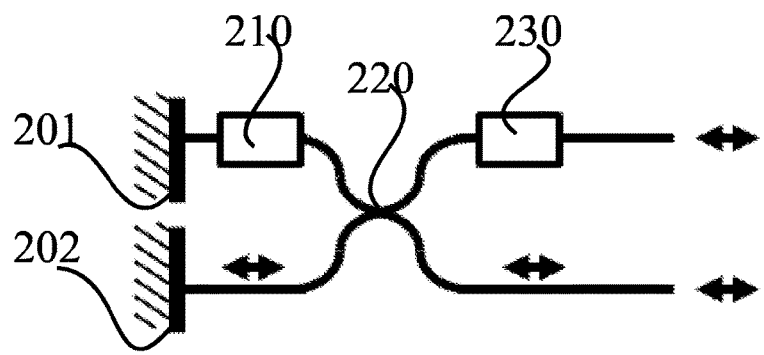
FIG. 2A illustrates dual rail encoding and compensation.

FIG. 2A illustrates dual rail encoding and compensation. Phase shifters 210 and 230 may be configured to transform an incoming dual rail encoded state and reflect other states. In other words, regardless of what the polarization rotation in fibre 101 is that needs to be compensated, phase shifters 210 and 230 may be configured to reflect back to fibre 101 polarizations that will wind up being aligned with measurement bases in receiver 110. In this configuration, phase shifts may be calculated for each bit, taking into account a desired qubit state that needs to be generated and the compensation that needs to be applied to overcome polarization rotation in fibre 101. The design in FIG. 2A employs reflectors 201 and 202 for the dual rail arms. Such reflectors may comprise, for example, coated chip facets. The design of FIG. 2A comprises 2x2 coupler 220.

Figure 2B:
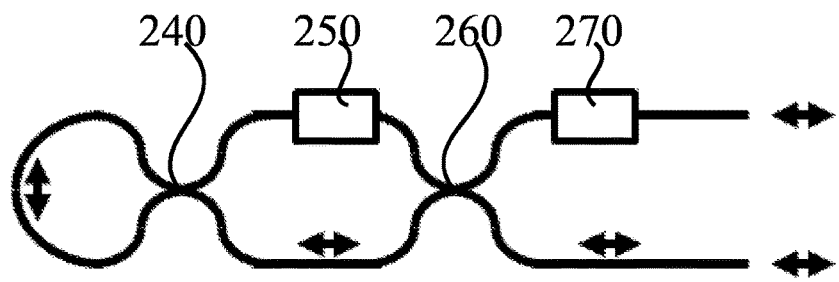
FIG. 2B illustrates dual rail encoding and compensation.

FIG. 2B illustrates dual rail encoding and compensation. FIG. 2B is similar to FIG. 2A, except that instead of reflectors 201 and 202, the system of FIG. 2B employs a waveguide loop to cause the dual rail encoded light to be guided back toward the fibre. The design of FIG. 2B comprises 2x2 couplers 240 and 260, as well as phase shifters 250 and 270.

Figure 2C:
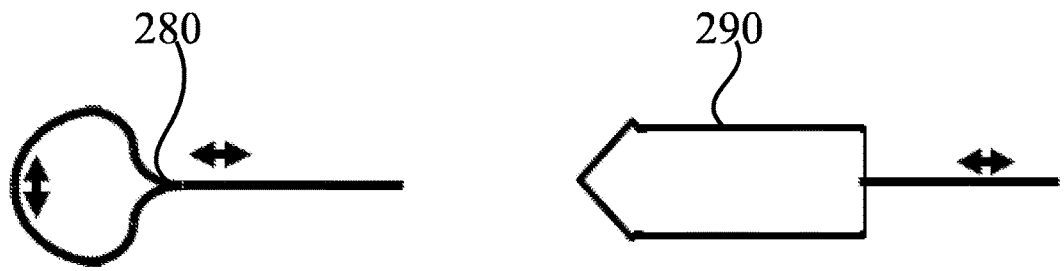
FIG. 2C illustrates arrangements to reflect light.

FIG. 2C illustrates arrangements to reflect light. These arrangements may be employed in causing light to be guided back toward its origin, such as, for example, in emitter 120 to guide light received from receiver 110 back toward receiver 110 via fibre 101. FIG. 2C illustrates a 1x2 coupler 280 with a loop, on the left, and an MMI reflector 290 comprising a 45 degree corner, achieving retroreflection, on the right.

Figure 3A:
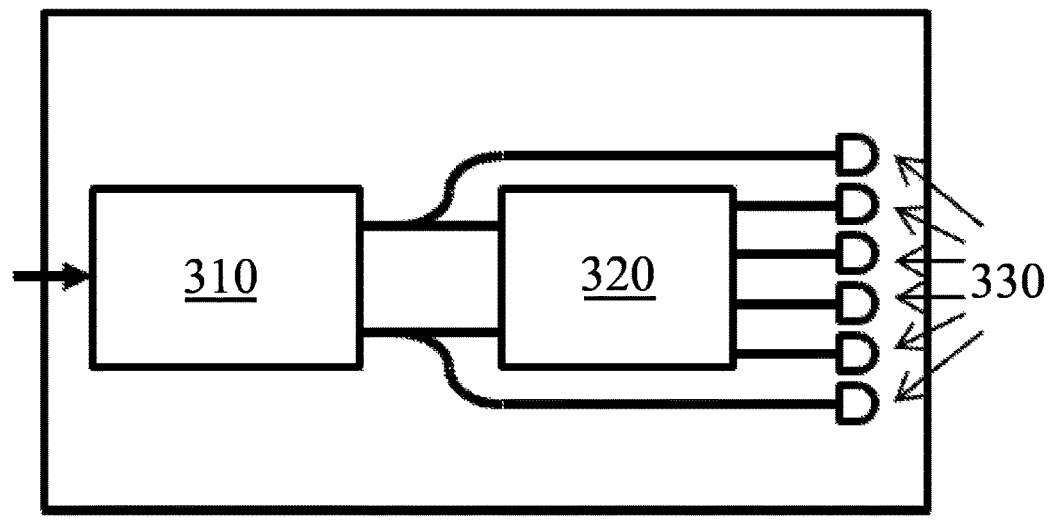
FIG. 3A illustrates a first architecture for a receiver in accordance with at least some embodiments of the present invention.

FIG. 3A illustrates a first architecture for a receiver in accordance with at least some embodiments of the present invention. Polarization beam splitter-rotator 310 may be configured to split light incoming from the fibre to horizontal and vertical polarization bases and rotate it so that both paths have the same polarization. Part of the photons are conveyed to single photon detectors 330. The photons not conveyed to single photon detectors 330 are conveyed to a 90 degree hybrid 320 that allows measurement of the two other bases, namely diagonal-antidiagonal and circular right-circular left. This measurement design may be implemented on silicon, for example. Beam splitter-rotator 310 may comprise a polarization splitting fibre coupler. 90 degree hybrid 320 may comprise a 4x4 multi-mode interferometer, MMI, for example. Detectors 330 may comprise, for example, superconducting nanowire deposited on the waveguides.

Figure 3B:
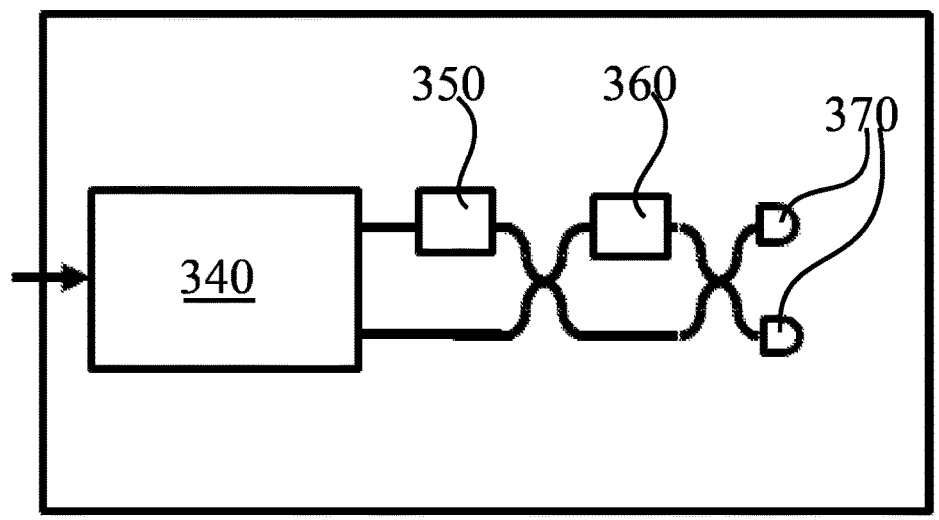
FIG. 3B illustrates a second architecture for a receiver in accordance with at least some embodiments of the present invention.

FIG. 3B illustrates a second architecture for a receiver in accordance with at least some embodiments of the present invention. In FIG. 3B, polarization beam splitter-rotator 340 is configured to split the incoming light according to its polarization to obtain dual rail form light. Then the measurement basis may be selected by operating one or two phase shifters 350, 360. Detection takes place in detectors 370.

Figure 4A:
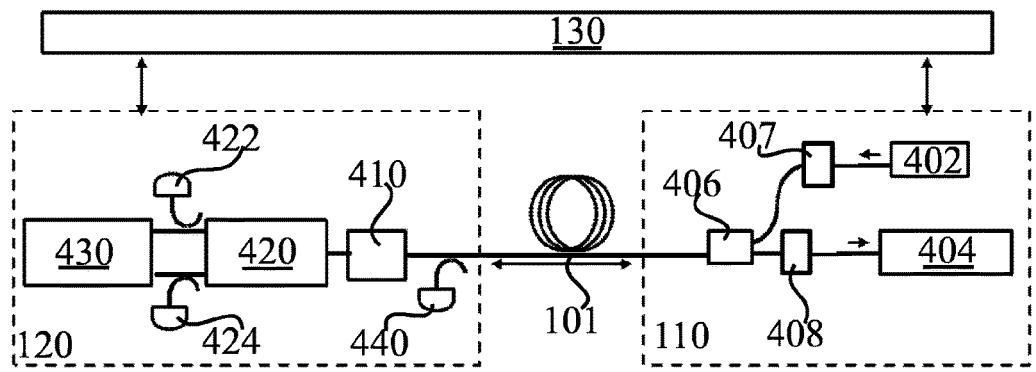
FIG. 4A illustrates an architecture in accordance with at least some embodiments of the present invention, where polarization compensations are performed in the receiver.

FIG. 4A illustrates an architecture in accordance with at least some embodiments of the present invention, where polarization compensations are performed in the receiver. Receiver 110, emitter 120, communication path 130 and fibre 101 correspond to like structure as in FIG. 1A. A light source 402 transmits light via pre-compensation stage 407, so that when the light arrives in emitter 120, it is aligned with bases of the emitter after propagation through fibre 101 which incurs polarization rotation. Detector 440 may measure an intensity of light incoming in emitter 120, and variable attenuator 410 may be used to select an output power for encoded light transmitted from emitter 120 back toward receiver 110 via fibre 101. PBS 420 may convert the light incoming in emitter 120 to dual rail form, and dual rail encoder 430 may encode the light with the information that is to be communicated to receiver 110. Subsequently, the encoded dual rail format light is conveyed back to PBS 420 for conversion to polarization encoded format, and the light can then be conveyed back to receiver 110 via fibre 101. Detector Z+, 422, and detector Z−, 424, may be employed to help controlling the polarization pre-compensation after the light source. In receiver 110, the light traverses coupler or circulator 406, and undergoes a second pre-compensation stage 408 to correct for polarization rotation incurred in fibre on the way from emitter 120 to receiver 110. Finally, detector 404 may be configured to determine the information encoded into the light in dual rail encoder 430 in emitter 120.

Figure 4B:
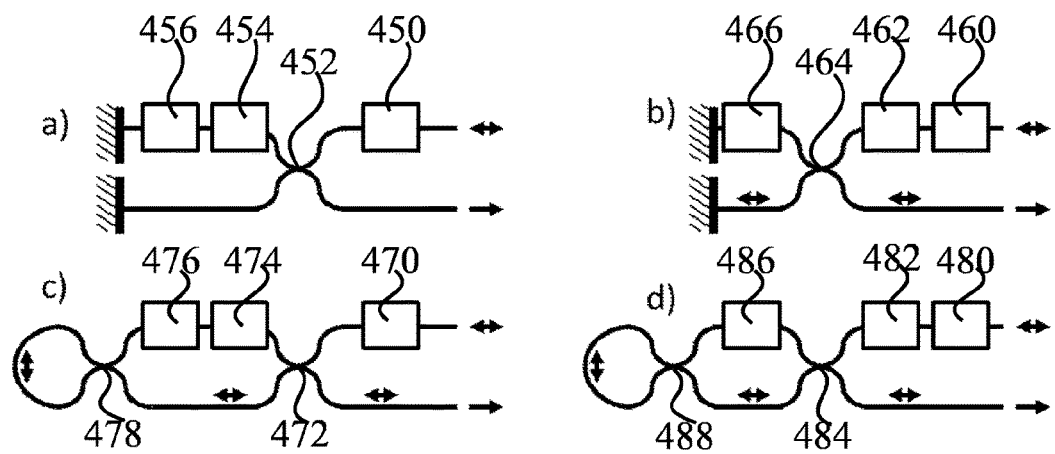
FIG. 4B illustrates encoder designs in accordance with at least some embodiments of the present invention.

FIG. 4B illustrates encoder designs in accordance with at least some embodiments of the present invention. In a), phase shifters 450, 454, 456 and 2x2 coupler 452 are used to encode light in dual rail. Here, reflectors are used to convey light back toward its origin. In b), phase shifters 460, 462, 466 and 2x2 coupler 464 are used to encode light in dual rail. Here, reflectors are used to convey light back toward its origin as in a). In c), phase shifters 470, 474, 476 and 2x2 coupler 472 are used to encode light in dual rail. 2x2 coupler 478 and a loop are used to convey light back toward its origin. In d), phase shifters 480, 482, 486 and 2x2 coupler 484 are used to encode light in dual rail. 2x2 coupler 488 and a loop are used to convey light back toward its origin.

The encoders of FIG. 4B may be configured to operate in a system with up to six states in fixed basis, that is, driven by bit streams of constant amplitude. For a), 456 may correspond to $\{0, \pi/2\}$, 454 may correspond to $\{0, \pi/4\}$ and 450 may correspond to $\{0, \pi/2\}$, for example.

For b) of FIG. 4B, the following table comprises reflected states when input light is in the top waveguide. 0 corresponds to no phase shift, 1 corresponds to a phase shift of $\pi/2$ for phase shifter 466, $\pi/4$ for phase shifter 462 and $\pi/2$ for phase shifter 460.

| Phase shifter 466 | Phase shifter 462 | Phase shifter 460 | State | |
|---|---|---|---|---|
| 0 | 0 | 0 | \|0⟩ | Z− |
| 1 | 0 | 0 | \|1⟩ | Z+ |
| 0 | 1 | 0 | \|0⟩ + \|1⟩ | X+ |
| 1 | 1 | 0 | \|0⟩ − \|1⟩ | X− |
| 0 | 0 | 1 | \|0⟩ | Z− |
| 1 | 0 | 1 | \|1⟩ | Z+ |
| 0 | 1 | 1 | \|0⟩ − i\|1⟩ | Y− |
| 1 | 1 | 1 | \|0⟩ + i\|1⟩ | Y+ |

Figure 5A:
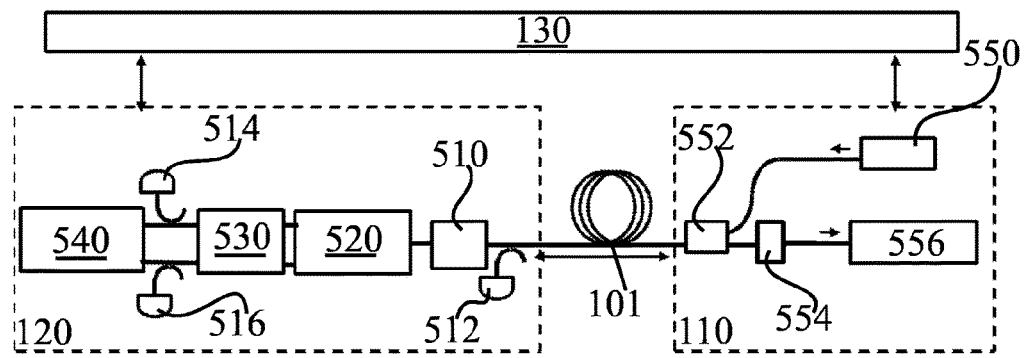
FIG. 5A illustrates architecture in accordance with at least some embodiments of the present invention.

FIG. 5A illustrates architecture in accordance with at least some embodiments of the present invention. Fibre 101, receiver 110, emitter 120 and communication path 130 correspond to like elements in FIG. 1A. In the architecture of FIG. 5, compensation for polarization rotations incurred in fibre 101 takes place in both receiver 110 and emitter 120. Light source 550 provides light, via coupler or circulator 552 and fibre 101, to emitter 120. In emitter 120, a power of the light may be measured by detector 512. The power of the light may be controlled by variable attenuator 510. PBS 520 may be configured to convert the light to dual rail form, and compensation stage 530 may act on the dual rail form light to compensate for polarization rotation incurred in the light when traversing fibre 101 from receiver 110 to emitter 120. Dual rail encoder 540 may encode the dual rail form light with the information that it is desired to communicate from emitter 120 to receiver 110. Detector Z+, 514, and detector Z−, 516, may be employed to help control the polarization compensation. The encoded dual rail form light may then be converted to polarization encoded light in PBS 520, and the polarization encoded light may then be conveyed back to receiver 110 via fibre 101.

In receiver 110, the light received from emitter 120 via fibre 101 may be conveyed through coupler or circulator 552 and post-compensation stage 554 to detector 556 for measurement. Post-compensation stage 554 may be configured to remove polarization rotation incurred in the light when traversing fibre 101 from emitter 120 to receiver 110. Post-compensation stage 554 may operate on polarization encoded light, or it may be arranged to convert the light to dual rail encoded light and operate on the dual rail encoded light to compensate for the polarization rotations incurred in fibre 101.

Figure 5B:
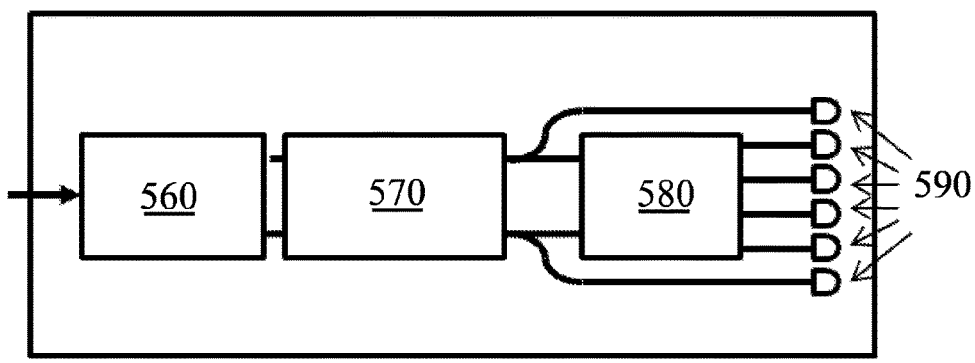
FIG. 5B illustrates a receiver architecture in accordance with at least some embodiments of the present invention.

FIG. 5B illustrates a receiver architecture in accordance with at least some embodiments of the present invention. The illustrated receiver comprises a polarization beam splitter-rotator 560 configured to convert incoming polarization encoded light to dual rail form, a dual rail compensation stage configured to compensate, at least in part, for polarization rotation incurred in fibre 101, and finally a 90 degree hybrid 580 and detectors 590, such as those described above in connection with FIG. 3A.

Figure 6A:
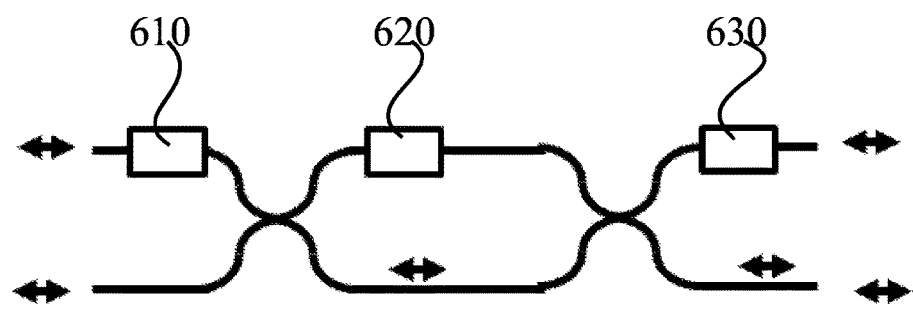
FIG. 6A illustrates a possible design for a dual rail compensation stage of FIG. 5A or FIG. 5B.

FIG. 6A illustrates a possible design for a dual rail compensation stage of FIG. 5A or FIG. 5B. The compensation stage comprises phase shifters 610, 620 and 630. The phase shifters may be configurable. The design of FIG. 6A is capable of performing in a six state (or fewer) communication system. A 2×2 coupler may be disposed between phase shifters 610 and 620, and again between phase shifters 620 and 630, as illustrated in the figure.

Figure 6B:
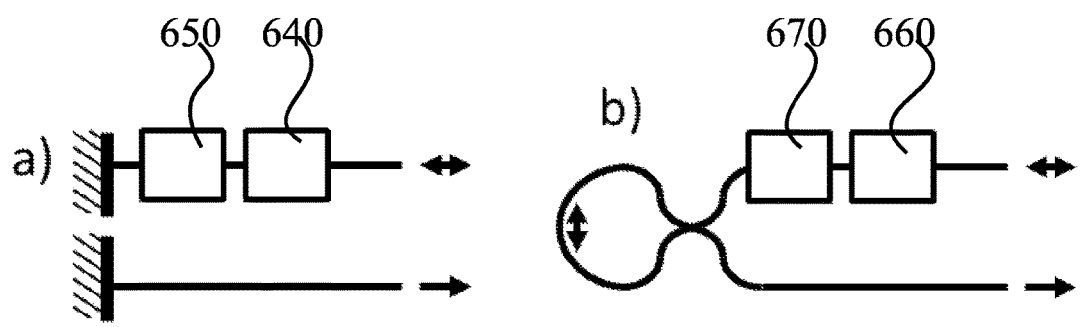
FIG. 6B illustrates possible designs for a dual rail compensation stage of FIG. 5A or FIG. 5B.

FIG. 6B illustrates possible designs for a dual rail compensation stage of FIG. 5A or FIG. 5B. Where a four state protocol is employed instead of a six state (or fewer) protocol, the number of phase shifters needed may be reduced to two, from three. A design may use reflectors as on the left, with phase shifters 640 and 650, or the design may use a loop as on the right, with phase shifters 660 and 670. A 2×2 coupler can couple the loop to the dual rail compensation stage as illustrated on the right.

Figure 7:
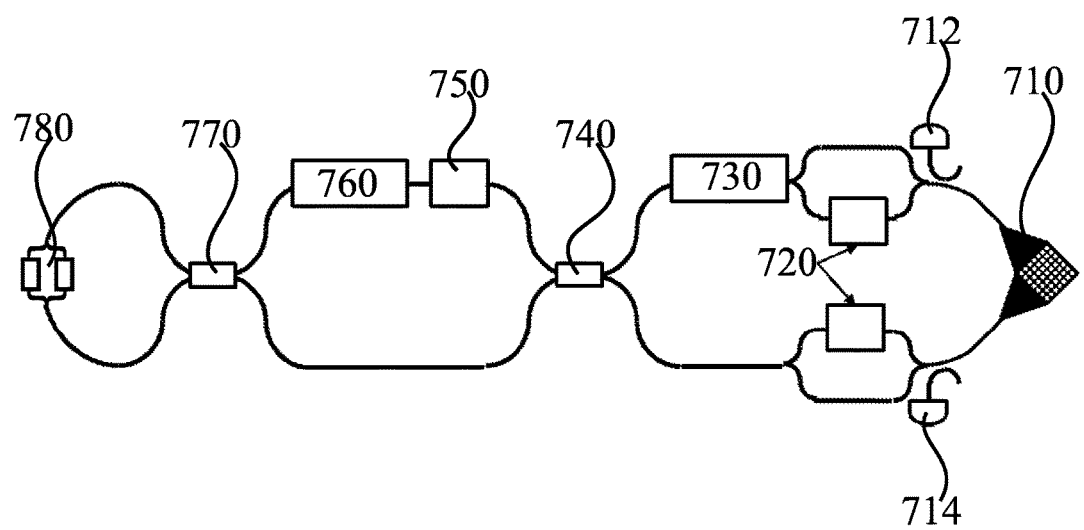
FIG. 7 illustrates a silicon implementation with a polarization splitting fibre coupler in accordance with at least some embodiments of the present invention.

FIG. 7 illustrates a silicon implementation with a polarization splitting fibre coupler in accordance with at least some embodiments of the present invention. The implementation, which may comprise an example of a silicon photonics implementation of at least part of the emitter, comprises polarization splitting fibre coupler 710, which is configured to convert light arriving in the emitter to dual rail form. Detector Z+, 712, and detector Z−, 714, may be employed to help control polarization rotation compensation. Phase shifters 730, 750 and 760 may configurably cause the dual rail form light to be encoded with the information that is to be transmitted to the receiver, and to compensate at least in part for polarization rotation incurred in fibre 101. In the illustrated implementation, a loop on the left is used to convey light back toward its origin. 2×2 MMI couplers 740 and 770 convey the dual rail form light in the implementation. MZI attenuators 720 may configurably be used to select a light power to emit back into the fibre. In general, in various embodiments of the invention a pulsed mode may be employed. Pulse modulation may be performed in one of several possible stages before the return trip of the light in the fibre, for example, the light source itself may be modulated, an output of the laser may be modulated, for example using MZI, or modulation may be performed in the encoder, as long as both rails are modulated. Modulation may also be combined in an attenuation stage. In FIG. 7, an MZI amplitude modulation 780 is included as one example of such an implementation.

Figure 8:
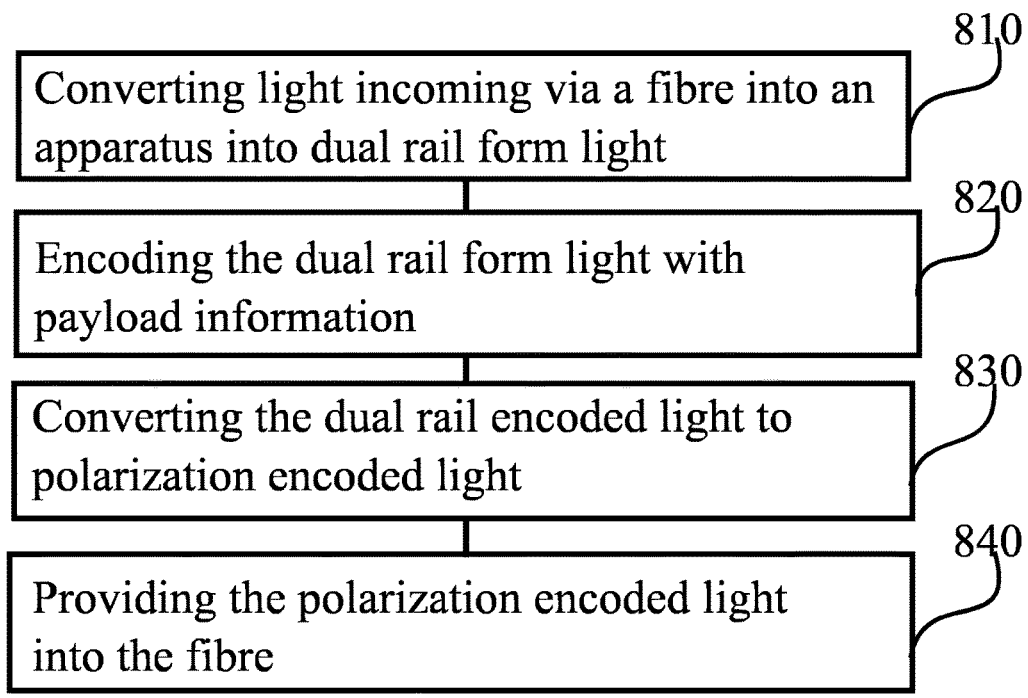
FIG. 8 is a flow graph of a second method in accordance with at least some embodiments of the present invention.

FIG. 8 is a flow graph of a second method in accordance with at least some embodiments of the present invention. The phases of the illustrated method may take place in emitter 120, for example.

Phase 810 comprises converting light incoming via a fibre into an apparatus into dual rail form light. Phase 820 comprises encoding, with a dual rail encoder, the dual rail form light with payload information. Phase 830 comprises converting the dual rail encoded light to polarization encoded light. Finally, phase 840 comprises providing the polarization encoded light into the fibre. In general, dual rail encoded light is encoded dual rail form light.

Figure 9:
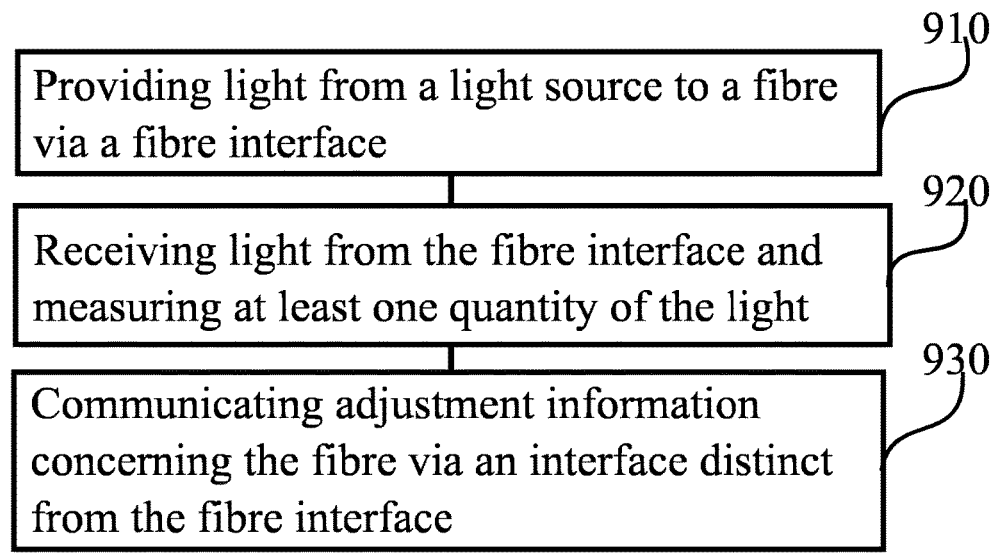
FIG. 9 is a flow graph of a third method in accordance with at least some embodiments of the present invention.

FIG. 9 is a flow graph of a third method in accordance with at least some embodiments of the present invention. The phases of the illustrated method may take place in receiver 110, for example Phase 910 comprises providing light from a light source to a fibre via a fibre interface. The light may be unencoded, for example. Phase 920 comprises receiving light from the fibre interface and measuring at least one quantity of the received light. Finally, phase 930 comprises communicating adjustment information concerning the fibre via an interface distinct from the fibre interface. Communicating the adjustment information may comprise transmitting and/or receiving the adjustment information.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in optical communication.

ACRONYMS LIST

IP Internet protocol
p2p peer-to-peer
MMI multi-mode interferometer
MZI Mach-Zehnder Interferometer
PBS polarization rotation splitter combiner
SM Single mode

The invention claimed is:

1. An apparatus comprising:
a first optical converter arranged to receive polarization encoded light from a fibre interface, to convert the polarization encoded light into dual rail form light and to output the dual rail form light into two waveguides;
a dual rail encoder configured to encode the dual rail form light from the two waveguides with payload information and to modify the dual rail form light to correct, based on adjustment information concerning a fibre, for polarization rotation caused by the fibre, and
wherein an output of the dual rail encoder is coupled to the first optical converter or to a second optical converter disposed between the dual rail encoder and the fibre interface, and wherein the first optical converter or the second optical converter is coupled so as to convert the dual rail form light from the dual rail encoder into polarization encoded light and to provide this polarization encoded light into the fibre interface.

2. The apparatus according to claim 1, wherein the first optical converter comprises a polarization rotator splitter combiner arranged to receive light from the output of the dual rail encoder.

3. The apparatus according to claim 1, wherein the first optical converter comprises a polarization splitter rotator, and the second optical converter comprises a polarization rotator combiner arranged to convert the output of the dual rail encoder into polarization encoded light.

4. The apparatus according to claim 1, wherein the apparatus further comprises at least one variable optical attenuator, each of the at least one variable optical attenuator being configured to apply a variable attenuation to reduce light intensity.

5. The apparatus according to claim 1, wherein the apparatus is configured to obtain the adjustment information via interface that comprises an electric communications interface.

6. The apparatus according to claim 1, wherein the dual rail encoder comprises a Mach-Zehnder interferometer.

7. The apparatus according to claim 1, wherein the payload information comprises an encryption key.

8. An apparatus comprising:
a fibre interface configured to provide light from a light source to the fibre;
a detector configured receive light from the fibre interface and to measure at least one quantity of the received light,
at least one processing core configured to communicate adjustment information concerning polarization rotation caused by the fibre via an interface distinct from the fibre interface; and
at least one polarization compensation stage configured to, at least in part, correct for polarization rotation caused by the fibre based at least in part on the adjustment information, wherein the at least one polarization compensation stage is comprised in a dual rail encoder configured to receive dual rail encoded light from a polarization rotator combiner, and to modify the dual rail encoded light.

9. The apparatus according to claim 8, wherein the at least one polarization compensation stage comprises a first polarization compensation stage arranged between the light source and the fibre interface.

10. The apparatus according to claim 8, wherein the at least one polarization compensation stage comprises a first polarization compensation stage arranged between the fibre interface and the detector.

11. The apparatus according to claim 8, wherein the at least one polarization compensation stage comprises a first polarization compensation stage arranged between the light source and the fibre interface and a second polarization compensation stage arranged between the fibre interface and the detector.

12. A method comprising: converting polarization encoded light incoming via a fibre into an apparatus into dual rail form light;
  encoding, with a dual rail encoder, the dual rail form light with payload information and modifying, with the dual rail encoder, the dual rail form light to correct, based on adjustment information concerning the fibre, for polarization rotation caused by the fibre;
  converting the dual rail encoded light to polarization encoded light, and providing the polarization encoded light into the fibre.

13. The method according to claim 12, further comprising obtaining, from an interface distinct from the fibre, the adjustment information concerning the fibre and controlling the dual rail encoder to at least in part modify the dual rail form light to correct for polarization rotation caused by the fibre.

14. The method according to claim 12, further comprising controlling at least one variable optical attenuator, to apply a variable attenuation to reduce light intensity.

15. The method according to claim 12, wherein the interface comprises an electric communications interface.

16. The method according to claim 12, wherein the dual rail encoder comprises a Mach-Zehnder interferometer.

17. The method according to claim 12, wherein the payload information comprises an encryption key.

18. A method, comprising:
  providing light from a light source to a fibre via a fibre interface;
  receiving light from the fibre interface and measuring at least one quantity of the received light,
  communicating adjustment information concerning polarization rotation caused by the fibre via an interface distinct from the fibre interface; and
  correcting for polarization rotation caused by the fibre based at least in part on the adjustment information, wherein the correcting for polarization rotation is performed in a dual rail encoder configured to receive dual rail form light from a polarization rotator combiner, and to modify the dual rail form light.

19. The method according to claim 18, wherein the correcting for polarization rotation takes place in a first polarization compensation stage arranged between the light source and the fibre interface.

20. The method according to claim 18, wherein the correcting for polarization rotation takes place in a first polarization compensation stage arranged between the fibre interface and a detector configured receive light from the fibre interface.

21. The method according to claim 18, wherein the correcting for polarization rotation takes place in a first polarization compensation stage arranged between the light source and the fibre interface and a second polarization compensation stage arranged between the fibre interface and a detector configured receive light from the fibre interface.

* * * * *